Feb. 21, 1956 G. H. MULLER 2,735,673
AUXILIARY SUSPENSION BUMPER
Filed Jan. 10, 1952 2 Sheets-Sheet 1
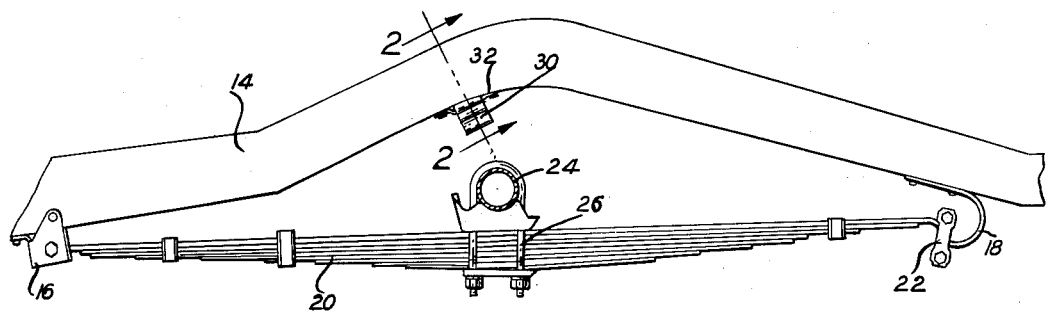
FIG. 1
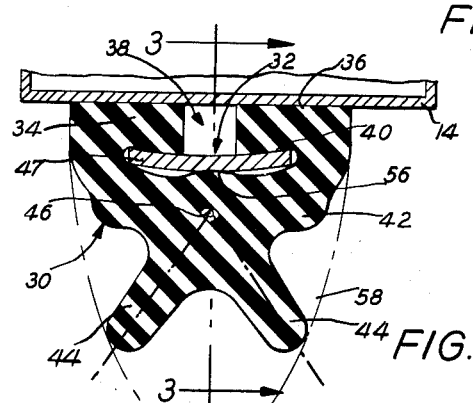
FIG. 2  FIG. 4
FIG. 3
FIG. 5  FIG. 6
G. H. MULLER
INVENTOR.
ATTORNEYS Feb. 21, 1956 G. H. MULLER 2,735,673
AUXILIARY SUSPENSION BUMPER
Filed Jan. 10, 1952 2 Sheets-Sheet 2

G. H. MULLER
INVENTOR.

BY E.C. McRae
J.R. Faulkner
J.H. Oster
ATTORNEYS

United States Patent Office 2,735,673
Patented Feb. 21, 1956

2,735,673

AUXILIARY SUSPENSION BUMPER

George H. Muller, Northville, Mich., assignor to Ford Motor Company, Dearborn, Mich., a corporation of Delaware Application January 10, 1952, Serial No. 265,783

7 Claims. (Cl. 267—63)

This invention relates generally to resilient auxiliary suspension bumpers for use in connection with the suspension systems of motor vehicles.

Conventional motor vehicles usually employ a pear-shaped rubber bumper mounted between the sprung and unsprung portions of the vehicle adjacent each road wheel. These bumpers are inoperative except during conditions of extreme wheel jounce at which thime they prevent a metal to metal impact between the vehicle frame and the axle or suspension member. Under these conditions they also serve to dampen the impact load. The common pear-shaped bumper, however, has several disadvantages. It is generally of molded construction and is consequently expensive. During deflection it stores energy and returns a considerable part of this energy to the axle or suspension member during the rebound movement, and thus materially interferes with the function of the main suspension springs and adversely affects the ride characteristics of the vehicle.

A principal object of the present invention, accordingly, is to overcome the above-mentioned and other disadvantages of the convetnional suspension bumper. Among these objects is the provision of a suspension bumper utilizing a smaller quantity of rubber and of such a shape as to permit it to be extruded, thus resulting in a saving in manufacturing cost.

A further object of the invention is to provide a suspension bumper having a low initial rate and thus minimizing the initial impact shock and noise when a bumper comes into play. A still further object is to provide such a bumper having a low initial rate and other characteristics such that a smaller portion of the stored energy is returned to the axle or suspension member, and the interference with the principal suspension system is minimized. Improved ride characteristics are therefore obtained.

Still another object of the invention is to provide a suspension bumper in which the rate and the performance characteristics are substantially unchanged during temperature changes.

The foregoing and other advantages will be apparent as this description proceeds, particularly when considered in connection with the attached drawings in which:

Figure 1 is a fragmentary side-elevational view of the rearward portion of a motor vehicle chassis, illustrating the suspension bumper of the present invention.

Figure 2 is an enlarged cross-sectional view taken on the plane indicated by the line 2—2 of Figure 1.

Figure 3 is a section taken on the plane indicated by the line 3—3 of Figure 2.

Figure 4 is a cross-sectional view similar to Figure 2 but showing the suspension bumper partially distorted during conditions of extreme wheel jounce.

Figure 5 is a graph comparing the rate curve of a bumper constructed in accordance with the present invention with the rate curve of a conventional type bumper.

Figure 6 is a speed-deflection graph comparing the rebound characteristics of a bumper constructed in accordance with the present invetnion with those of a conventional bumper.

Figure 7:
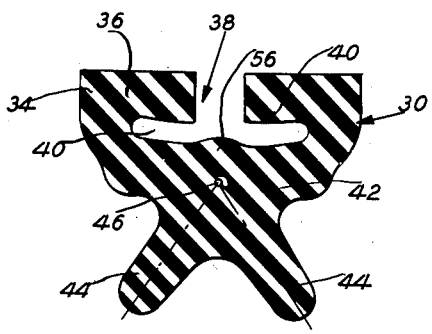
Figure 7 is a cross-sectional view of the improved bumper in its free position before being assembled to its supporting bracket.

Referring now to the drawings, and particularly to the embodiment of the invention shown in Figures 1 to 4 inclusive and Figure 7, the invention is shown as applied to the rear wheel suspension of a conventional rear wheel drive passenger car. The reference character 14 indicates a side frame member of the vehicle. Secured to the frame member 14 are front and rear spring hangers 16 and 18 respectively. A leaf spring 20 is pivotally connected at its forward end to the hanger 16 and at its rearward end is connected to the hanger 18 by means of a shackle 22. A conventional rear axle 24 is secured to an intermediate portion of the spring by means of U-bolts 26.

To prevent metal to metal impact between the axle 24 and the frame member 14 during conditions of extreme wheel jounce a rubber suspension bumper 30 is provided and is attached to the frame member 14 by means of a bracket 32.

The rubber bumper 30 comprises an elongated block of rubber or rubber-like resilient material. Prior to assembly of the bumper with the bracket and the frame the bumper is shaped in cross section as shown in Figure 7. The base 34 of the bumper has a flat bearing surface 36 and is formed with a T-shaped groove 38 extending lengthwise of the bumper from one end to the other. It will be noted that the T-shaped groove is of irregular shape and that its wing portions 40 are transversely curved.

Immediately below the wing portions 40 of the T-shaped groove 38 the bumper 30 is slightly decreased in width to form a body portion 42. A pair of diverging wings 44 are integrally formed beneath the body portion 42 of the bumper. In the form of the invention shown these wings are at an angle of 70° to each other and center lines through the wings intersect at an imaginary axis 46.

The bracket 32 attaching the rubber bumper 30 to the frame member 14 comprises a center section 47 extending through the horizontal portion of the T-shaped groove 38 in the bumper and having offset end portions 48 engaging the lower horizontal flange of the frame member 14. Studs 50 extend through apertures 52 in the offset end flanges 48 of the bracket 32 and through tapped holes 54 provided in the frame member 14. The center section 47 of the bracket is slightly curved in cross section to correspond to the curvature of the wing portions 40 of the rubber bumper. This curvature enables the base 34 of the bumper to be firmly clamped to the vehicle frame member 14 without causing the divided portions of the base to separate under pressure.

It will be noted from an examination of Figure 1 that the bumper assembly comprising the bumper 30 and the supporting bracket 32 are positioned forwardly of the vertical plane passing through the center of the rear axle 24 and that the assembly is set at an angle to the horizontal. During rising and falling movement of the rear wheels the rear axle 24 moves generally in an arcuate path about the axis of the pivotal connection between the forward end of leaf spring 20 and the front spring hanger 16, and the above-described location and inclination of the bumper properly position it for engagement by the rear axle 24.

Under such conditions the rear axle 24 is first engaged by the lower ends of the wings 44 of the rubber bumper, and continued relative movement of the axle toward the frame results in spreading these wings apart and folding them down against the body portion 42 of the bumper. This folding action is generally about the axis 46. Figure 4 illustrates the position of the wings 44 folded against the body portion 42 of the bumper.

The body portion 42 of the bumper is initially formed in its free position with a central longitudinally extending rib 56 projecting into the horizontal portion of the T-shaped slot 38 between the wings 40 and, as shown in Figure 2, engaging the center section 47 of the supporting bracket 32. The rib 56 transmits the initial load to the bracket 32 and avoids cutting of the rubber of the bumper on each side of the T-slot by reason of the sharp edges of the bracket. As the wings 44 are folded to the position shown in Figure 4, the body portion 42 of the bumper is forced against the center section of the bracket to complete a full engagement therewith. Further movement of the axle 24 toward the frame 14 can only be accomplished by a compression of the body portion and the folded wings of the bumper and it will be apparent that their compression requires a considerably greater force than the initial deflection of the folding wings. In other words, the rate of the bumper is relatively low during its initial stage and is greatly accelerated during its second stage.

Figure 5 is a graph illustrating the rate curve of the bumper shown in Figures 1 to 4 inclusive and Figure 7 as compared to the rate curve of a conventional pear-shaped bumper of the type commonly used in connection with motor vehicles and shown by the dot-dash line 58 in Figure 2. This graph plots deflection in abscissa and in ordinate the amount of load necessary to obtain the deflection. The dot-dash curve indicated by the reference character 60 is the rate curve of the conventional pear-shaped bumper 58 while the solid line curve 62 is the rate curve of the bumper 30 of the present invention. It will be noted that the bumper 30 has a relatively low initial rate as indicated by a comparison of the portion 64 of the curve 62 with the corresponding portion of the rate curve 60 of the conventional bumper. This portion of the curve is the result of the folding of the wings 44 against the body portion of the bumper. The portion 66 of the rate curve 62 of the bumper 30 represents the second phase of the deflection of the bumper after the wings have been folded to the position shown in Figure 4, and it will be seen that the rate is sharply accelerated during this phase. At the point 68 the rate of the bumper 30 has increased to the value of the rate of the conventional bumper.

The graph shown in Figure 6 plots deflection in abscissa against speed in ordinate. The curve 70 indicates the variation in the speed of the axle 24 throughout the compression stroke of the bumper 30 commencing with an initial impact speed $V_1$. When the deflection of the bumper reaches point 72 the speed of the axle has been decreased to zero and a rebound stroke follows. A portion of the energy is dissipated in heat during the compression stroke, part is transferred to the vehicle frame, and part is restored to the axle during the rebound stroke. The curve 74 represents the rebound stroke of the bumper 30 and it will be seen that the stroke terminates with a final speed $V_2$ when the bumper has expanded to its original position. The rebound speed $V_2$ is considerably lower in value than the initial impact speed $V_1$ and is also considerably lower than the final rebound speed $V_3$ resulting from plotting curve 76 to indicate the rebound stroke of a conventional pear-shaped bumper such as 58 after an initial impact speed equal to the impact speed $V_1$ plotted on curve 70.

The graphs of Figures 5 and 6 illustrate the advantage of the bumper of the present invention as compared to a conventional type bumper and show that the bumper of the present invention with its low initial rate results in a greater absorption of energy so that the energy returned to the vehicle is less. This means that the bumper of the present invention interferes less with the proper functioning of the principal suspension spring 20, and improved ride characteristics result.

In addition it has been found that the performance of the bumper 30 is substantially unchanged by reason of temperature changes as compared to a rate increase of from 10 to 30% when the conventional pear-shaped bumper 58 is subjected to a temperature drop from 70° F. to 10° F. Due to the low initial rate of the bumper 30 the initial impact between the axle and the bumper is less objectionable and is quieter.

The bumper 30 readily lends itself to manufacture by extrusion and a saving is accordingly effected as compared to the conventional bumper which is usually molded.

Figure 8:
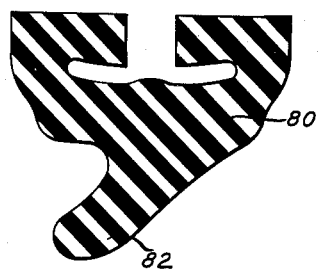
Figure 8 is a cross-sectional view of a modified suspension bumper.

Figure 8 shows a modified bumper 80 somewhat similar to bumper 30 but utilizing a single wing 82 depending from the body portion of the bumper and inclined toward one side thereof. Under certain circumstances this type may provide the desired rate characteristics.

Figure 9:
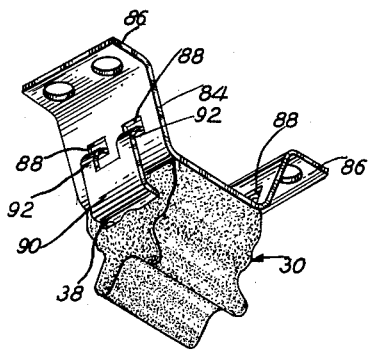
Figure 9 is a perspective view of the bumper shown in Figures 1 to 7 inclusive mounted upon a modified supporting bracket.

Figure 9 illustrates an alternate method of attaching the bumper 30 to a vehicle frame and is particularly useful when it is desired to mount the bumper a distance beneath the frame. A generally U-shaped bracket 84 is formed with horizontal outwardly extending flanges 86 for attachment to the vehicle frame. Openings 88 are provided in the opposite side walls of the bracket. A second U-shaped bracket 90 extends through the T-shaped slot 38 in the bumper 30 and is formed with ears 92 at opposite ends thereon which extend through the openings 88 in the bracket 84 and are bent over to form a complete assembly.

Figure 10:
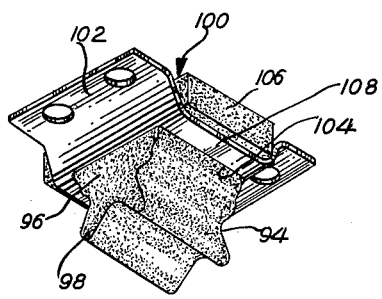
Figure 10 is a perspective view of an alternate bumper and bracket.

The modification of the invention shown in Figure 10 utilizes a rubber bumper 94. The body portion 96 and the wings 98 of the bumper are generally similar to the other forms previously discussed, but the bumper is formed without a T-shaped slot and with a solid base 100. The supporting bracket 102 is formed with a rectangular opening 104 through which the base 96 and wings 98 of the bumper extend. The base 100 of the bumper is provided with integral shoulders 106 along opposite edges thereof to be engaged by the connecting portions 108 of the bracket and to be clamped thereby against the vehicle frame member.

Figure 11:
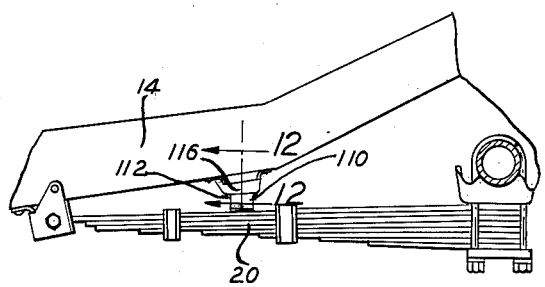
Figure 11 is a fragmentary side-elevational view similar to a portion of Figure 1 but showing a modified form of suspension bumper used in conjunction with a rear vehicle spring.
Figure 12:
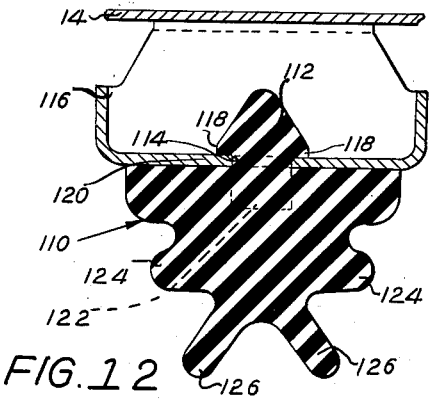
Figure 12 is an enlarged cross-sectional view taken on the plane indicated by the line 12—12 of Figure 11.

Figure 11 illustrates a further modification in which a bumper 110 is mounted in position to be engaged by the forward portion of the rear leaf spring 20 and to thus serve as a jounce rear spring bumper. As best seen in Figure 12 the bumper 110 is formed with an integral longitudinally extending rib 112 centrally of its base. The rib projects through an opening 114 in the supporting bracket 116 which in turn is secured to the frame 14 of the vehicle. The rib 112 on the base of the bumper has wing portions 118 overhanging the base 120 of the bracket at opposite sides of the opening 114 to secure the bumper to the bracket. A pair of ears 122 are turned down from the base 120 of the bracket at opposite ends of the opening 114 to provide supports for the ends of the bumper 110 and to eliminate sharp corners which might cut the rubber.

In the modification of Figures 11 and 12 the bumper 110 is provided with two pairs of wings 124 and 126. The wings are arranged to be successively folded over and thus provide two stages of spring rate prior to the final increased rate.

The utilization of the rubber bumper 110 in position to be engaged by a portion of the leaf spring forming the main suspension spring for the adjacent road wheel forms a suspension system having a variable spring rate. By varying the location of the rubber bumper relative to the leaf spring, and by properly selecting the size and shape of the bumper as well as the material of which it is formed, the resultant overall spring rate of the suspension system can be made variable in a predetermined pattern, as desired.

It will be understood that various means may be utilized to mount the bumper of the present invention to the vehicle frame, and also that if desired the bumper can be mounted upon the axle and arranged to engage the frame. While shown in connection with a rear axle suspension the bumper is also suitable for use in connection with front wheel suspensions of the independent type. Likewise, the particular shape of the bumper may vary within the scope of the invention which is primarily directed to forming an economically manufactured and assembled bumper having a low initial rate and a sharply increased rate during the final stages of bumper deflection so as to perform the necessary functions of a suspension bumper without seriously interfering with the rate or other operating characteristics of the principal springing system of the vehicle. The bumper dissipates a greater portion of the energy it receives than a conventional bumper, and consequently less energy is returned to the suspension system and the rebound speed is lower.

It will be understood that the invention is not to be limited to the exact construction shown and described, but that various changes and modifications may be made without departing from the spirit and scope of the invention, as defined in the appended claims.

What is claimed is:

1. A resilient suspension bumper for a motor vehicle having a sprung member and an unsprung member mounted for relative movement toward and away from each other, comprising a unitary bumper of resilient material having a base portion positioned adjacent one of said members and so located as to be engaged by the other of said members upon a predetermined movement of said members toward each other, means supporting said base of the bumper upon said one member, said base being formed with a pair of shoulders on opposite sides thereof facing outwardly from said one member, and a pair only of diverging wings integrally formed with said base and projecting outwardly beyond said shoulders and foldable toward said shoulders when engaged by said other member, the over-all span of said pair of diverging wings in a direction transversely of the bumper being less in the free position of said bumper than the over-all transverse width of the base portion of said bumper, said diverging wings being yieldably foldable at a relatively low spring rate when initially engaged by said other member and being engageable with said shoulders upon a predetermined further movement of said other member toward one member to provide a materially increased spring rate for the bumper.

2. A resilient suspension bumper for a motor vehicle having a sprung member and an unsprung member mounted for relative movement toward and away from each other, comprising a unitary bumper of resilient material having a base portion positioned adjacent one of said members and so located as to be engaged by the other of said members upon a predetermined movement of said members toward each other, means supporting said base of the bumper upon said one member, the opposite sides of said base portion being undercut to form shoulders extending generally parallel to said one member and facing outwardly therefrom, and a pair only of diverging wings integrally formed with said base portion and projecting outwardly from said undercut portion to be yieldably foldable toward said shoulders at a relatively low spring rate when engaged by said other member, the over-all span of said pair of diverging wings in a direction transversely of the bumper being less in the free position of said bumper than the over-all transverse width of the base portion of said bumper, and said wings being engageable with said shoulders after a predetermined further movement of said other member toward said one member to provide a materially increased spring rate for the bumper upon additional movement of said other member toward said one member.

3. A resilient suspension bumper for a motor vehicle having a sprung member and an unsprung member mounted for relative movement toward and away from each other, comprising a unitary bumper of resilient material having a base portion positioned adjacent one of said members and so located as to be engaged by the other of said members upon a predetermined movement of said members toward each other, said bumper having a wing of relatively narrow width compared to the width of said base portion projecting outwardly from said base portion at an acute angle thereto and toward said other member for initial engagement thereby, said bumper being formed with a T-shaped slot in its base portion, and a mounting bracket having a body portion extending through said T-shaped slot and end flanges projecting beyond opposite sides of said bumper for attachment to said one member.

4. A resilient suspension bumper for a motor vehicle having a sprung member and an unsprung member mounted for relative movement toward and away from each other, comprising a unitary bumper of resilient material having a base portion positioned adjacent one of said members and so located as to be engaged by the other of said members upon a predetermined movement of said members toward each other, said bumper having a wing of relatively narrow width compared to the width of said base portion projecting outwardly from said base portion at an acute angle thereto and toward said other member for initial engagement thereby, said bumper being formed with an elongated slot extending longitudinally therethrough substantially parallel to the part of said base portion engaging said one member, and a mounting bracket having a flat body portion extending through said slot and formed with integral end flanges offset from said body portion and arranged in alignment with said part of said base portion, and means attaching said end flanges to said one member.

5. A resilient suspension bumper for a motor vehicle having a sprung member and an unsprung member mounted for relative movement toward and away from each other, comprising a unitary bumper of resilient material positioned adjacent one of said members and so located as to be engaged by the other of said members upon a predetermined movement of said members toward each other, said bumper having a generally rectangular base portion adapted to be positioned adjacent one of said members and secured thereto, the opposite side walls of said base portion being generally parallel to each other adjacent said one member and each being formed with an elongated groove extending generally parallel to the base of the bumper and located at a predetermined distance from said base to form a narrow neck portion transversely of the bumper, and a pair of relatively narrow diverging wings projecting laterally outwardly from said narrow neck portion at an angle to each other, said diverging wings being located wholly between parallel planes containing the opposite sides of the base portion of the bumper to enable said wings to engage the base portion of the bumper upon a predetermined movement of said members toward each other to provide a materially increased spring rate during this portion of the relative movement between said members.

6. A resilient suspension bumper for a motor vehicle having a sprung member and an unsprung member mounted for relative movement toward and away from each other, comprising a bumper of resilient material positioned adjacent one of said members and so located as to be engaged by the other of said members upon a predetermined movement of said members toward each other, said bumper having a base portion formed with a T-shaped slot therein opening into the base of the bumper, a mounting bracket having a generally flat body portion extending through said T-shaped slot and offset end flanges projecting beyond opposite sides of said bumper for attachment of said one member, the body portion of said bumper having a rib extending longitudinally of said T-shaped slot adjacent the central portion thereof and engaging the central zone of the body portion of said mounting bracket, the bumper being depressed on opposite sides of said rib to be spaced from the body portion of said mounting bracket during the free position of said bumper.

7. A resilient suspension bumper for a motor vehicle having a sprung member and an unsprung member mounted for relative movement toward and away from each other, comprising a unitary bumper of resilient material positioned adjacent one of said members and so located as to be engaged by the other of said members upon a predetermined movement of said members toward each other, said bumper having a base portion having a high spring rate and a wing portion considerably narrower than said base portion and projecting therefrom at an angle, said narrow wing portion in the free position of said bumper being located wholly between parallel planes containing the opposite sides of the base portion of said bumper, and said narrow wing portion having a lower spring rate than said base portion and initially engageable with the other of said members upon a predetermined movement of said members toward each other and foldable into engagement with said base portion upon a predetermined further movement of said members toward each other.

References Cited in the file of this patent

UNITED STATES PATENTS

| | | |
|---|---|---|
| 1,644,683 | Leipert | Oct. 11, 1927 |
| 2,148,640 | Pretz | Feb. 28, 1939 |
| 2,161,648 | Widman | June 6, 1939 |
| 2,188,815 | Murphy | Jan. 30, 1940 |
| 2,207,367 | Anibal | July 9, 1940 |
| 2,222,377 | Slack | Nov. 19, 1940 |
| 2,580,975 | Tea | Jan. 1, 1952 |
| 2,593,305 | Hunter | Apr. 15, 1952 |
| 2,596,780 | Meyers et al. | May 13, 1952 |
| 2,678,210 | Reuter | May 11, 1954 |

FOREIGN PATENTS

| | | |
|---|---|---|
| 315,643 | Great Britain | July 18, 1929 |
| 515,885 | Great Britain | Dec. 18, 1939 |